(12) United States Patent
Centore, III et al.

(10) Patent No.: US 8,671,431 B2
(45) Date of Patent: Mar. 11, 2014

(54) SYSTEM AND METHOD FOR PROVIDING COMMUNICATIONS SERVICE TO INDIVIDUAL UNITS OF A MULTIPLE DWELLING UNIT

(75) Inventors: Michael Anthony Centore, III, Dunellen, NJ (US); Richard Lee Harvey, Neshanic Station, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1196 days.

(21) Appl. No.: 12/571,935

(22) Filed: Oct. 1, 2009

(65) Prior Publication Data

US 2011/0083152 A1    Apr. 7, 2011

(51) Int. Cl.
*H04N 7/20* (2006.01)
*H04N 7/18* (2006.01)
*H04B 7/14* (2006.01)
*H04B 1/38* (2006.01)
*H01Q 13/10* (2006.01)

(52) U.S. Cl.
USPC ................ 725/71; 725/78; 725/81; 455/561; 455/16; 343/770

(58) Field of Classification Search
USPC .......................................................... 725/71
See application file for complete search history.

(56) References Cited

U.S. PATENT DOCUMENTS

| | | | | |
|---|---|---|---|---|
| 5,835,128 | A * | 11/1998 | Macdonald et al. | 725/81 |
| 6,486,907 | B1 * | 11/2002 | Farber et al. | 725/78 |
| 6,871,081 | B1 * | 3/2005 | Llewellyn et al. | 455/561 |
| 7,986,647 | B2 * | 7/2011 | Ghadaksaz | 370/293 |
| 8,397,271 | B2 * | 3/2013 | Riggsby | 725/149 |
| 2004/0110468 | A1 * | 6/2004 | Perlman | 455/13.3 |
| 2005/0144645 | A1 * | 6/2005 | Casey et al. | 725/95 |

* cited by examiner

*Primary Examiner* — Chris Parry

(57) ABSTRACT

A system and method for providing communications service to individual units of a multiple dwelling unit ("MDU") is disclosed. The system may comprise a communications service unit configured to distribute communications signal to at least one unit of a MDU via at least one cable, wherein the at least one cable are distributed along the exterior of the MDU, one or more network interface elements communicatively coupled to the at least one cable, wherein each of the one or more network interface elements are positioned near a window of the MDU, and an antenna communicatively coupled to each of the one or more network interface elements, wherein the antenna is configured to transmit the communications signal to one or more network elements in at least one unit of the MDU.

23 Claims, 4 Drawing Sheets

SYSTEM AND METHOD FOR PROVIDING COMMUNICATIONS SERVICE TO INDIVIDUAL UNITS OF A MULTIPLE DWELLING UNIT

BACKGROUND INFORMATION

Bundled communications service, such as Internet, telephone, and television service, are becoming increasingly popular among consumers, businesses, and other subscribers. Signal distribution systems generally rely on either a cable network or on free-space propagation for delivering television signals to individual users or subscribers. For example, cable-based television systems transmit one or more individual television signals or "channels" over wire, while free-space propagation systems transmit one or more channels over the air.

Antennas or dishes associated with land-based or satellite-based (e.g., wireless) signal distribution systems are typically large and cumbersome, and they generally need to point in a specific direction (e.g., south) to be able to transmit or receive signal. As a result, it may be difficult to install a receiving antenna (e.g., a receiving dish antenna) for each individual unit within a multiple dwelling unit ("MDU"), such as an apartment or condominium. Even if a single dish antenna is used to provide satellite signals to units within a MDU, to support such a system may be fraught with installment and maintenance problems. Furthermore, land-based or satellite-based signal distribution systems may require the insertion of a dedicated cable throughout a MDU. However, older MDUs may not be pre-wired with dedicated wiring and to do so within each unit of a MDU may come at great expense to a landlord, tenant, or property owner.

As a result, it may be important to have a system and method for comprehensively and efficiently providing communications service to individual units of a MDU.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Figure 1:
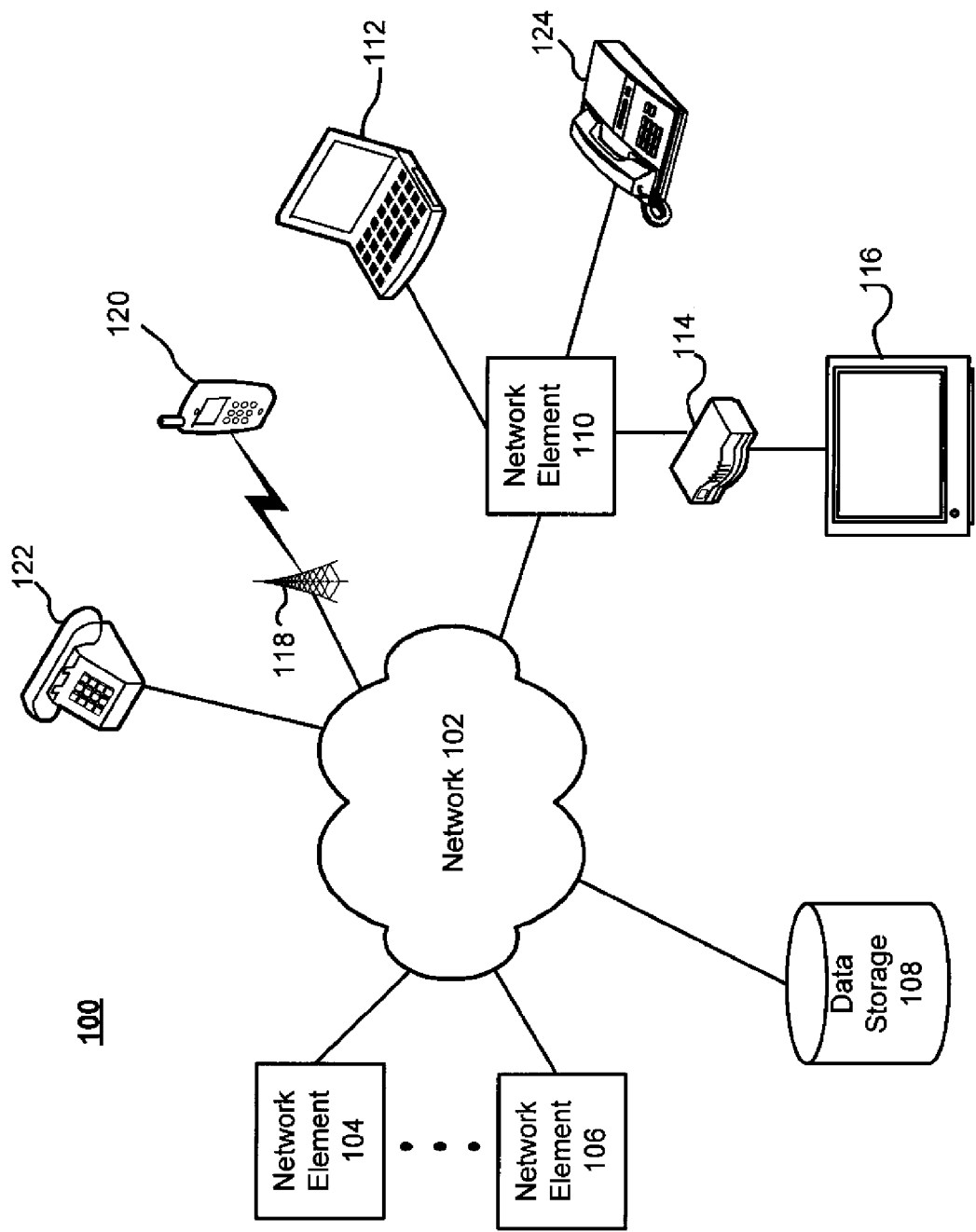
FIG. 1 depicts a block diagram of a system architecture for providing communications service to individual units of a MDU, according to an exemplary embodiment of the present disclosure

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing communications service to individual units of a MDU. That is, exemplary embodiments may, among other things, expand and optimize signal distribution by comprehensively and effectively providing at least one unit of a MDU with communications service, such as Internet, telephone, or television service.

Most signal distribution systems require cables to be installed inside a building, such as an MDU, by drilling holes and routing wires through walls, floors, and ceilings. These cables may then be covered up with moldings or other cover-up materials. The traditional method for cable installation through walls and along hallways inside existing multiple dwelling units may be labor intensive and may require lots of construction time inside each building and within each individual dwelling unit. When multiple companies or service providers wire a building, issues may arise when placement of new cables becomes difficult, or virtually impossible because other companies or service providers may have already used up all the easily available space to wire a building. As a result, integrating a wireless solution may provide a great opportunity for savings in effective signal distribution and deployment costs.

In one or more exemplary embodiments, a cable may be strung from the roof of an MDU to a location near the ground level of the exterior of the building. The cable may be a fiber-optic line or a transmission cable, e.g., a coaxial/electric cable. The cable may also include a power line. The location of the cable may be immediately adjacent to the windows of rooms in which service is to be provided. For example, if television service is provided, the cables may be situated near windows closest to the living room, family room, or bedroom, where television is typically viewed. In an MDU, living rooms, family rooms, and bedrooms may also line up vertically floor to floor, one above the other. The cable may feed from the roof or from the ground. At the roof location, the cable may feed from a satellite antenna for satellite television service or other fixed wireless service. At the ground location, the cable may feed from a cable television service, a fiber-optic service, or other wired service.

At each window a device may be used to provide or receive signals into or from the desired room (e.g., living room, family room, or bedroom) of an individual unit of an MDU. In one or more embodiments, the signal from the cable may be amplified by using a network interface, such an amplifier, splitter, or fiber-to-RF converter, and may feed the signal to a second network element, such as an antenna (e.g., patch antenna), which may be fastened to or near the window of the room. In this example, for television service, a wireless transceiver at the set top box may receive and decode the signal and provide television service in that room. For Internet or phone service, a wireless transceiver at a modem, router, or other similar network element may receive and decode the signal and provide Internet service, telephone service, or a combination thereof to that room.

It should be appreciated that the term, "multiple dwelling unit" or "MDU," as used herein, may refer to an apartment building, a condominium or townhome complex, an office building, a recreational or sports facility, a multi-use building, etc. An MDU should not be limited to a place for dwelling. It should also be appreciated that while embodiments are directed to an MDU, other implementations may also be considered, such as a single family house or other similar dwelling or building having multiple rooms.

FIG. 1 depicts a block diagram of a system architecture 100 for providing communications service to individual units of a MDU, according to an exemplary embodiment of the present disclosure. As illustrated, network 102 may be communicatively coupled with one or more devices including network element 104, network element 106, data storage 108, and network element 110. Other devices may be communicatively coupled with network 102 via one or more intermediary devices, such as transceiver 118, network element 110, or a wireline phone 122. Wireless device 120 may be communicatively coupled with network 102 via transceiver 118. Network client 112 and set-top box 114 may be communicatively coupled with network 102 via network element 110. Wireless control 110 may be communicatively coupled with set-top box 114 via infrared, Bluetooth communication, or other wireless technologies. A video display (e.g., television set 116) may be communicatively coupled to set-top box 114. It should also be appreciated that other various components may also be communicatively coupled with the network element 110, such as a Voice over Internet Protocol ("VoIP") phone 124.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an IEEE Ethernet 802.3.

Transceiver 118 may be a repeater, a microwave antenna, a cellular tower, or another network access device capable of providing connectivity between to different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Wireless device 120 may be a mobile communications device, wireline phone, a cellular phone, a mobile phone, a satellite phone, a personal digital assistant ("PDA"), a computer, a handheld MP3 player, a handheld multimedia device, a personal media player, a gaming device, or other devices capable of communicating with network 102 via transceiver 118.

Network elements, transceiver 118, data storage 108, and set-top box 114 may include one or more processors for recording, transmitting, receiving, or storing data. Although network elements, transceiver 118 and data storage 108 are depicted as individual elements, it should be appreciated that the contents of one or more of a network element, transceiver 118, and data storage 108 may be combined into fewer or greater numbers of devices and may be connected to additional devices not depicted in FIG. 1. Furthermore, the one or more devices may be local, remote, or a combination thereof a first network elements, transceiver 118, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104, 106, and 110 may be one or more servers (or server-like devices), such as a Session Initiation Protocol ("SIP") server. Network elements 104, 106, and 110 may include one or more processors (not shown) for recording, transmitting, receiving, or storing data. According to one or more embodiments, network elements 104, 106, and 110 may be servers providing media content to one or more users. In other embodiments, network elements 104, 106, and 110 may be servers that provide network connection between two or more wireless devices 118. Network elements 104, 106, and 110 may also be servers of a service provider, the Internet, a broadcaster, a cable television network, or another media provider.

Network element 110 may be a residential gateway, such as a router, an optical network terminal or another piece of Customer Premises Equipment ("CPE") providing access to one or more pieces of equipment. For example, network element 110 may provide audio/video programming content feeds to a set-top box, such as set-top box 116. Network element 110 may also provide network connectivity for other clients, such as a Voice Over IP ("VoIP") phone (not shown) and a network client, e.g., network client 112.

Network client 112 may be a desktop computer, a laptop computer, a server, a personal digital assistant, or other computer capable of sending or receiving network signals (e.g., CPE, a television, radio, phone, appliance, etc.). Network client 112 may use a wired or wireless connection. It should also be appreciated that the network client 112 may be a portable electronic device capable of being transported in or out of a unit of the MDU. For example, these may include a digital picture frame, an electronic reader device, or other portable device. Such a device may transmit or receive signals and store information while in the unit of the MDU, and in the event it is transported out of the unit, the portable electronic device may still operate using the data (e.g., digital image, electronic book, etc.) it stored while in the unit of the MDU. Although depicted as connected via a residential gateway in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards.

According to one or more embodiments, set-top box 114 may receive a media selection, such as a channel selection from a user (e.g., via wireless remote). Set-top box 114 may provide the programming feed corresponding to the selected media channel. According to some embodiments, set-top box 114 may analyze metadata to identify search criteria related to the media selection. The metadata may be local to set-top box 114 or remote from set-top box 114. For example, set-top box 114 may analyze closed captioning data associated with the selected programming feed, electronic program guide information associated with the programming feed, or other metadata. Set-top box 114 may request, query, or otherwise interface with remote sources of data. According to some embodiments, set-top box 114 may forward selection data to one or more network components, such as one or more of network elements 104, 106, and 110. Set-top box 114 may also forward metadata associated with a media selection to one or more network elements, such as network elements 104, 106, and 110. According to some embodiments, set-top box 114 may forward only a channel selection and one or more network elements may separately obtain metadata.

System 100 may be used for mobile telecommunications between two or more components of the system 100, e.g., two or more wireless devices, wireless device with network client, set top box with wireless device, landline phone, VoIP, etc. System 100 may also be used for transmitting or receiving multimedia content. The various components of system 100 as shown in FIG. 1 may be further duplicated, combined or integrated to support various applications and platforms. Additional elements may also be implemented in the systems described above to support various applications.

Figure 2:
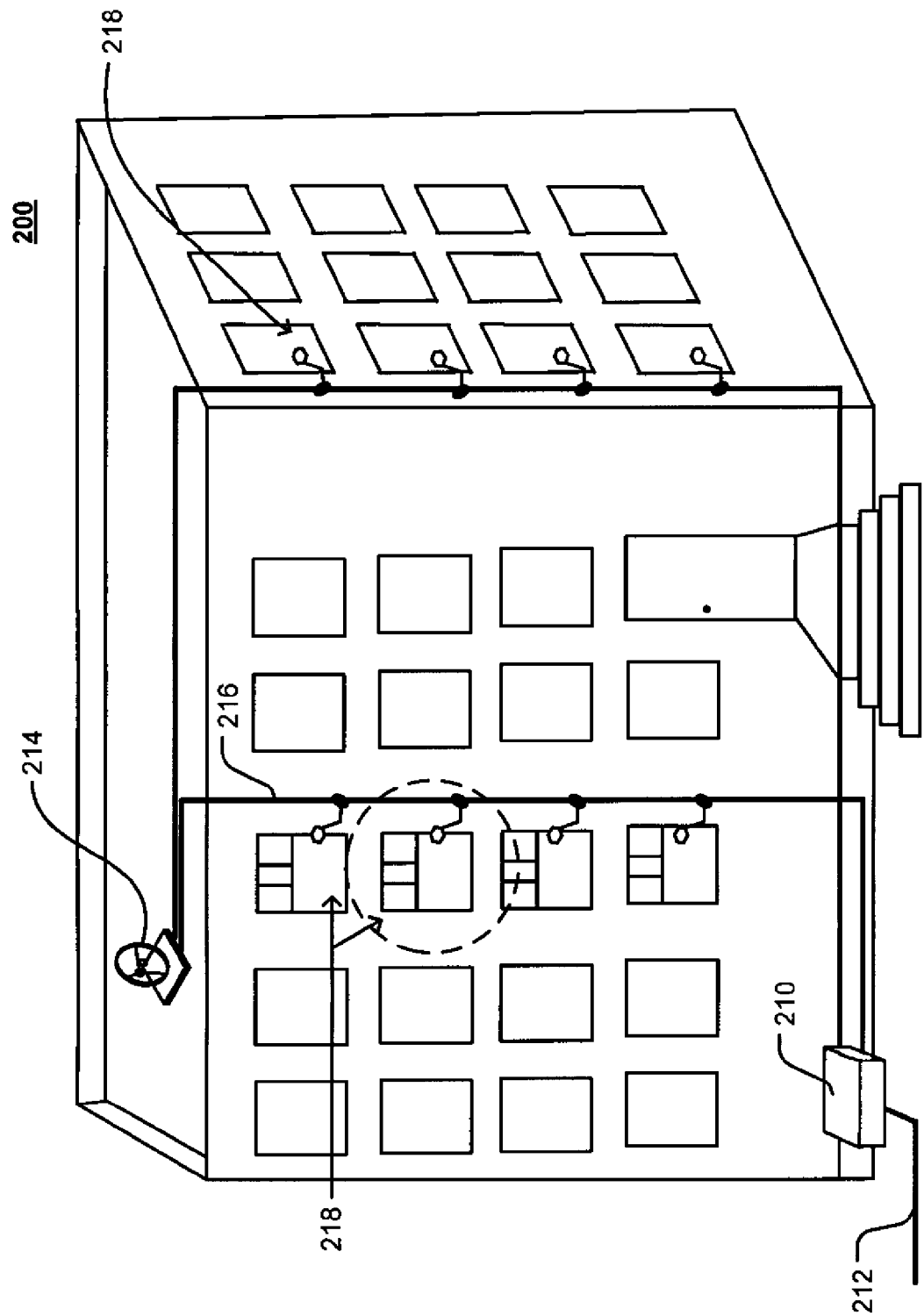
FIG. 2 depicts an signal distribution system architecture for providing communications service to individual units of an MDU, according to an exemplary embodiment.

FIG. 2 depicts an signal distribution system architecture 200 for providing communications service to individual units of an MDU, according to an exemplary embodiment. Referring to FIG. 2, the signal distribution system architecture 200 for an MDU may include a ground unit 210 (e.g., transmission cable or fiber-optic unit) communicatively coupled to one or more network elements of a service provider via transmission cable or fiber-optic wiring 212. In other embodiments, the signal distribution system architecture 200 may include an antenna unit 214 (e.g., a satellite TV or fixed wireless antenna) situated on top of the MDU building. Cables 216 (e.g., fiber-optic cable or transmission cable line) communicatively coupled to the ground unit 210 or the antenna unit 214 may be positioned near or adjacent to a window 218 of the MDU. It should be appreciated that cables 216 may also include a power line communicatively coupled to a power source (e.g., in the ground unit or antenna unit) to power the network interface 320.

Figure 3:
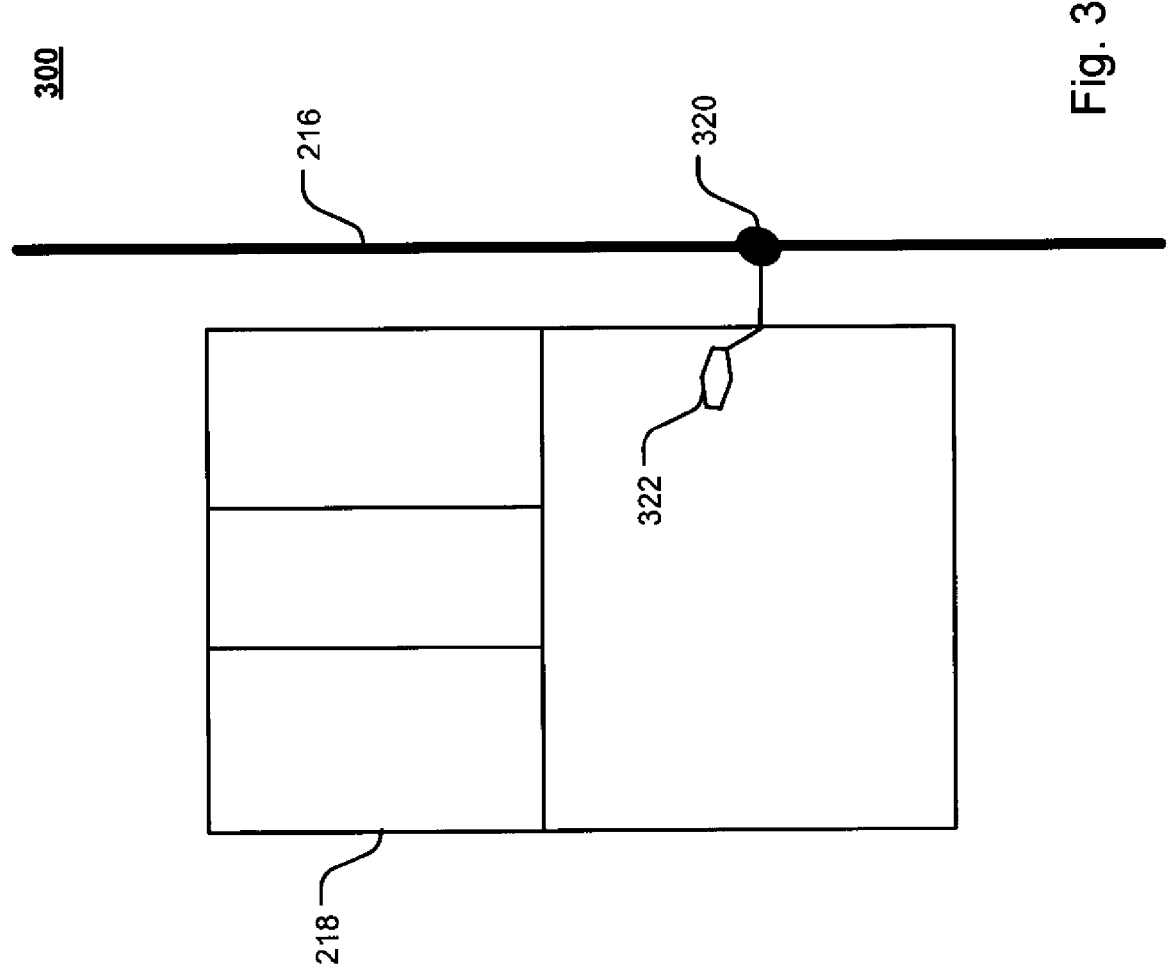
FIG. 3 depicts an illustrative diagram of a window configuration for providing communications service to individual units of an MDU, according to another exemplary embodiment.

FIG. 3 depicts an illustrative diagram of a window configuration 300 for providing communications service to individual units of an MDU, according to another exemplary embodiment. Referring to FIG. 3, for example, a window 218 of an MDU (e.g., a window to a living room, family room, or bedroom) may have a cable 216 traveling in a vertical direction placed near the window 218. As discussed above with reference to FIG. 2, the cable 216, which may be a fiber with power, may provide communications signal from the antenna unit 214 situation on the roof of the MDU or the ground unit 210 at the bottom of the MDU. An network interface 320 may be provided at various points along the cable 216. In this example, the network interface may be provided at a point along the cable 216 immediately outside the window 218. The interface 320 may include one or more network elements (e.g., network element 110). For example, the network interface 320 may be an amplifier, splitter, fiber-to-RF converter or other network interface for transmitting or receiving signal. A patch antenna 322 may be communicatively coupled to the network interface 320. The patch antenna 322 may be any network element that transmits or receives signals. For example, in order to provide television service at a unit of the MDU, a wireless transceiver at the set top box 114 may decode one or more signals received from the patch antenna 322. In other embodiments, a wireless transceiver at a modem, router, or other similar network element may decode the signal from the patch antenna 322 to provide Internet or telephone service to that room.

The patch antenna 322 may be fastened to or near the window 218. It should be appreciated that the patch antenna 322 may be fastened on inside the window 218, outside the window, a moving part of the window 218, a non-moving part of the window 218, or a wall adjacent to the window 218. One or more various configurations may be provided to optimize signal distribution and signal strength. In some embodiments, the patch antenna 322 may also be integrated with the network interface 320 as a single network element.

In one or more embodiments, the patch antenna 322 may be a wireless antenna configured to transmit or receive one or more communications signals. Communications may be achieved via transmission of electric, electromagnetic, optical, or wireless signals or packets that carry digital data streams using a standard telecommunications protocol or a standard networking protocol. These may include Session Initiation Protocol ("SIP"), Voice over IP ("VoIP") protocols, Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols. Other protocols or systems that are suitable for transmitting or receiving data via packets or signals may also be provided. For example, cabled network or telecom connections such as an Ethernet RJ45/Category 5 Ethernet connection, a fiber connection, a traditional phone wireline connection, a cable connection or other wired network connection may also be used. Communication may also include standard wireless protocols including IEEE 802.11a, 802.11b, 802.11g, 801.11n, or via protocols for a wired connection, such as an IEEE Ethernet 802.3.

Other various embodiments and considerations may also be provided to optimize signal distribution. For example, various cable material and antenna types may be utilized to optimize signal distribution and strength. In cases where desired location for the set top box or router is not readily accessible through the window 218, another network element, such as an interior repeater, may be installed to extend coverage to the desired location or room. Because the patch antenna 322 may radiate directly into that room, less radio signal power may be required and therefore less interference may created. As a result, higher radio frequencies may be used and more radio spectrum may therefore be available.

It should be appreciated that while embodiments are primarily directed to wireless configurations, wired configurations may also be provided. For example, the patch antenna 322 may also consist of a transmission cable (e.g., a wire) that travels into the unit through the window or window frame area to provide one or more wired communications signals.

Since MDUs may not be built and designed similarly, it should be appreciated that while the cable 216 of FIGS. 2 and 3 depict the cables running vertically along the MDU, the cable 216 may also run horizontally, diagonally, in a grid-like pattern, or other configuration to optimize signal distribution to individual units of an MDU. It should be appreciated that the cable 216 may also be colored, coated, or bundled to reduce visual impact. For example, if the wall of the MDU is beige, the color of the cable 216 used may designed to match the building exterior or a sheath of matching color may be used to wrap the cable or other components (e.g., power together) for aesthetic appeal.

While depicted as various servers, components, elements, or devices, it should be appreciated that embodiments may be constructed in software or hardware, as a separate or stand-alone device, or as part of an integrated transmission or switching device.

Additionally, it should also be appreciated that system support and updating the various components of the system may be easily achieved. For example, a system administrator may have access to one or more of the components of the system, network, components, elements, or device. It should also be appreciated that the one or more servers, components, elements, or devices of the system may not be limited to physical components. These components may be software-based, virtual, etc. Moreover, the various servers, components, elements, or devices may be customized to perform one or more additional features and functionalities. Such features and functionalities may be provided via deployment, transmitting or installing software or hardware.

It should also be appreciated that each of the communications devices, servers, or network elements may include one or more processors for providing communications service to individual units of a multiple dwelling unit. It should be appreciated that one or more data storage systems (e.g., databases) may also be coupled to each of the devices or servers of the system. In one embodiment, the one or more data storage systems may store relevant information for each of the servers and system components.

It should be appreciated that the contents of any of these one or more data storage systems may be combined into fewer or greater numbers of data storage systems and may be stored on one or more data storage systems or servers. Furthermore, the data storage systems may be local, remote, or a combination thereof to clients systems, servers, or other system components. In another embodiment, information stored in the databases may be useful in providing additional personalizations and customizations.

By providing wiring outside the building, savings related to installation labor costs may be achieved. For example, since nothing inside an MDU needs to be disturbed, except for the installation of the patch antenna 322 at the window 218, installation may be simplified, particularly if there may already be an existing installation indoors from a competitive provider.

Another advantage of wiring outside may be that the cables 216, whether running vertically, horizontally, or diagonally, may be in generally straight configurations. In other words, the cables 216 may not bend or be bent as much as they would be if they were installed inside of the MDU, which may result damage and other related issues.

Safety may also be an important benefit of above-described embodiments. For example, since a cable 216 may run vertically up and down an MDU and fastened at the roof to an antenna unit 214, at the ground to a ground unit 210, or at each window 218, there may effectively be no need for an installer to climb the exterior of the building. The installer may simply need to be access to each window, which may be achieved from the inside of the residence. If the building is large and has many floors or windows that may not open, an exterior non-intrusive system may be used to facilitate installation. For example, an installer may use a window washing support system, which may already be installed or used at a large building, to install one or more components It should be appreciated that both switched video service (e.g., where only the currently viewed channel is sent) and multiple signal service may be supported. Also, as discussed above, a two-way service may be supported for Internet and other data-related services. In-room broadband wireless illumination and detection for broadcast and bi-directional services may also be provided from the window-patch antenna configuration fed from thin-fiber spines in the cable 216.

Emergence of Internet Protocol (IP) video, rapid product advancements, and the need for upgrades to outdated legacy systems in MDUs, embodiments of the present invention provide essential market-timing for broadcast multimedia and broadband services. Cost synergies, reduced installation time, and simplified or automated in-room installation tasks may be achieved.

Figure 4:
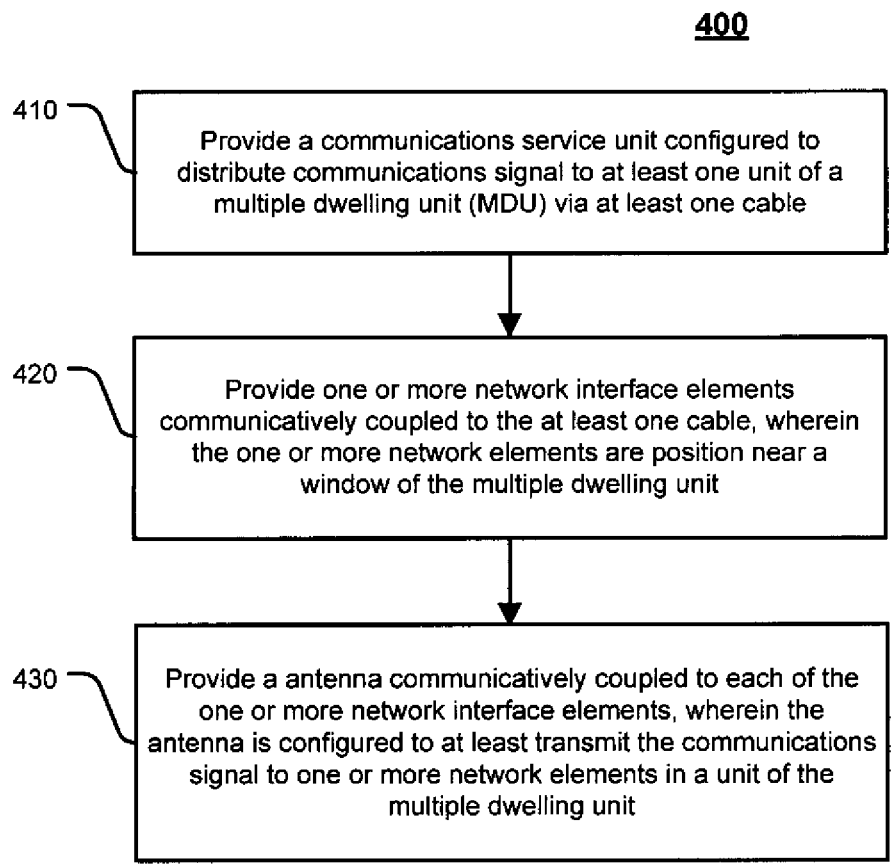
FIG. 4 depicts an illustrative flowchart of a method for providing communications service to individual units of a MDU, according to another exemplary embodiment.

FIG. 4 depicts an illustrative flowchart of a method for providing a priority level of a call, according to another exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 200 in FIG. 2 and configuration 300 in FIG. 3, by way of example, and various elements of systems 200 and 300 are referenced in explaining the exemplary method of FIG. 4. Each block shown in FIG. 4 represents one or more processes, methods, or subroutines carried in the exemplary method 400. A computer readable medium comprising code to perform the acts of the method 400 may also be provided. Referring to FIG. 4, the exemplary method 400 may begin at block 410.

At block 410, a communications service unit may be configured to distribute communications signal to at least one unit of a MDU via at least one cable 216. As discussed above, the at least one cable 216 may be distributed along the exterior of the MDU in a vertical cable configuration, a cable horizontal configuration, diagonal cable configuration, a grid configuration, or a combination thereof. The communications service unit may be a ground unit 210 or an antenna unit 214. In one or more embodiments, the at least one cable 216 may include a fiber-optic line or an transmission cable line. In other embodiments, the at least one cable may also include a power line.

At block 420, one or more network interface elements 320 may be communicatively coupled to the at least one cable 216. In one or more embodiments, each of the one or more network interface elements 320 may be positioned near a window 218 of the MDU. The one or more network interface elements 320 may comprise at least one of an amplifier, a splitter, a fiber-to-RF converter, and a network interface for transmitting or receiving wireless signals. The one or more network interface elements 320 may be also positioned on the exterior of the MDU.

At block 430, a patch antenna 322 may be communicatively coupled to each of the one or more network interface elements 320. The patch antenna 322 may be configured to transmit or receive communications signal to or from one or more network elements in at least one unit of the MDU. The one or more network elements may be a customer premises equipment (CPE) comprising at least one of a set top box, a modem, a router, a server, a computer, a laptop, a television, a radio, a phone, or an appliance. In some embodiments, the patch antenna 322 may be fastened to at least one of a non-moving portion of the window 218. In other embodiments, the patch antenna 322 may be fastened to at least one of a moving portion of the window 218 or an area near the window 218.

It should be appreciated that one or more repeaters may be provided to extend coverage to the desired location or room. Because the patch antenna 322 may radiate directly into that room, less radio signal power may be required and therefore less interference may created. Due to direct line-of-sight transmission (e.g., where the patch antenna 322 may see directly into the unit), higher radio frequencies may be used and more radio spectrum may therefore be available.

In summary, embodiments may provide a system and method for comprehensively and effectively providing communications service to individual units of a MDU. It should be appreciated that although embodiments are described primarily with broadband service (e.g., television, telephone, or data), the systems and methods discussed above are provided as merely exemplary and may have other various applications and implementations.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

We claim:

1. A system, comprising:
a communications service unit configured to distribute a communications signal to at least one unit of a multiple dwelling unit via at least one cable, wherein the at least one cable are distributed along an exterior of the multiple dwelling unit;
one or more network interface elements communicatively coupled to the at least one cable and configured to transmit and/or receive the communications signal using Session Initiation Protocol (SIP) or Voice Over IP (VoIP), wherein each of the one or more network interface elements are positioned near a window of the multiple dwelling unit; and
an antenna communicatively coupled to each of the one or more network interface elements, wherein the antenna is configured to transmit the communications signal to one or more network elements in at least one unit of the multiple dwelling unit;
wherein the antenna is a patch antenna and the one or more network elements in at least one unit of customer premises equipment (CPE) comprise a set top box with a wireless transceiver that decodes the communications signal received from the patch antenna to provide Internet and other data related services to the at least one unit of the multiple dwelling unit;
the system further comprising an interior repeater to extend coverage of the communications signal, and wherein:
the system supports both switched video service and multiple signal service, and
the at least one cable distributed along the exterior of the multiple dwelling unit is colored to match a color of the exterior of the multiple dwelling unit.

2. The system of claim 1, wherein the communications service unit comprises at least one of a ground unit and an antenna unit.

3. The system of claim 2, wherein the ground unit is at least one of a fiber-optic cable unit and an electric cable unit.

4. The system of claim 2, wherein the antenna unit is at least one of a satellite antenna and a fixed wireless antenna.

5. The system of claim 1, wherein the multiple dwelling unit comprises at least one of an apartment building, a condominium complex, a townhome complex, an office building, a recreational or sports facility, and a multi-use building.

6. The system of claim 1, wherein the at least one cable comprise a power line and at least one of a fiber-optic line and an electric cable line.

7. The system of claim 1, wherein distribution of the at least one cable along the exterior of the multiple dwelling unit comprises a vertical cable configuration, a cable horizontal configuration, diagonal cable configuration, a grid configuration, or a combination thereof.

8. The system of claim 1, wherein the one or more network interface elements comprise at least one of an amplifier, a splitter, a fiber-to-RF converter, and a network interface for transmitting or receiving wireless signals.

9. The system of claim 1, wherein the one or more network interface elements are positioned on the exterior of the multiple dwelling unit.

10. The system of claim 1, wherein the antenna is a wireless antenna configured to transmit and receive the communications signal to the one or more network elements.

11. The system of claim 1, wherein the antenna is fastened to at least one of a non-moving portion of the window.

12. The system of claim 1, wherein the customer premises equipment (CPE) comprises at least one of a set top box, a modem, a router, a server, a computer, a laptop, a television, a radio, a phone, and an appliance.

13. A method, comprising:
providing a communications service unit configured to distribute communications signal to at least one unit of a multiple dwelling unit via at least one cable, wherein the at least one cable are distributed along an exterior of the multiple dwelling unit;
providing one or more network interface elements communicatively coupled to the at least one cable and configured to transmit and/or receive the communications signal using Session Initiation Protocol (SIP) or Voice Over IP (VoIP), wherein each of the one or more network interface elements are positioned near a window of the multiple dwelling unit; and providing an antenna communicatively coupled to each of the one or more network interface elements, wherein the antenna is configured to transmit the communications signal to one or more network elements in at least one unit of the multiple dwelling unit;

providing an interior repeater to extend coverage of the communications signal;

wherein the antenna is a patch antenna and the one or more network elements in at least one unit of the multiple dwelling unit comprise a customer premises equipment (CPE) with a wireless transceiver that decodes the communications signal received from the patch antenna to provide Internet and other data related services to the at least one unit of the multiple dwelling unit, the antenna supports both switched video service and multiple signal service, and the at least one cable distributed along the exterior of the multiple dwelling unit is colored to match a color of the exterior of the multiple dwelling unit.

14. The method of claim 13, wherein the communications service unit comprises at least one of a ground unit and an antenna unit.

15. The method of claim 14, wherein the ground unit is at least one of a fiber-optic cable unit and an electric cable unit.

16. The method of claim 14, wherein the antenna unit is at least one of a satellite antenna and a fixed wireless antenna.

17. The method of claim 13, wherein the at least one cable comprise a power line and at least one of a fiber-optic line and an electric cable line.

18. The method of claim 13, wherein distribution of the at least one cable along the exterior of the multiple dwelling unit comprises a vertical cable configuration, a cable horizontal configuration, diagonal cable configuration, a grid configuration, or a combination thereof.

19. The method of claim 13, wherein the one or more network interface elements comprise at least one of an amplifier, a splitter, a fiber-to-RF converter, and a network interface for transmitting or receiving wireless signals.

20. The method of claim 13, wherein the one or more network interface elements are positioned on the exterior of the multiple dwelling unit.

21. The method of claim 13, wherein the antenna is configured to transmit and receive the communications signal to the one or more network elements.

22. The method of claim 13, wherein the customer premises equipment (CPE) comprises at least one of a set top box, a modem, a router, a server, a computer, a laptop, a television, a radio, a phone, and an appliance.

23. A non-transitory computer readable medium comprising code to perform the acts of the method of claim 13.

* * * * *